Jan. 5, 1954  M. R. EUVERARD  2,664,640
MICROMETER FOR MEASURING THIN INSULATION
Filed April 17, 1951
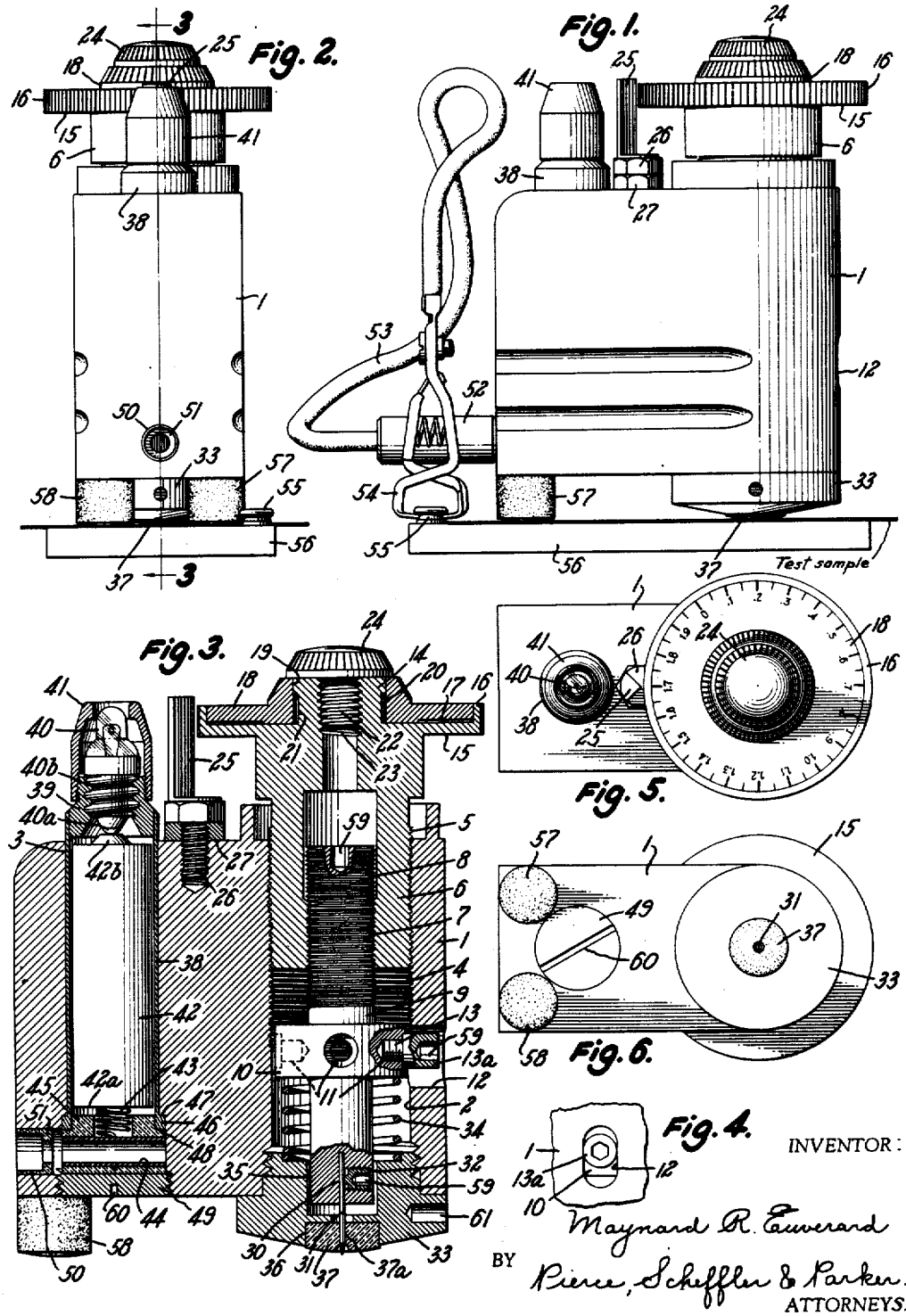
INVENTOR:
Maynard R. Euverard
BY Pierce, Scheffler & Parker
ATTORNEYS.

Patented Jan. 5, 1954

2,664,640

UNITED STATES PATENT OFFICE 2,664,640

MICROMETER FOR MEASURING THIN INSULATION

Maynard R. Euverard, Short Hills, N. J.

Application April 17, 1951, Serial No. 221,425

4 Claims. (Cl. 33—172)

The present invention relates to a precision gage, of the penetrating needle type, for measuring the thickness of relatively thin, solid, non-electrical conducting layers, films or foils, e. g., paint films, paper sheets, regenerated cellulose pellicles, and the like, in which an accurate determination of the distance of needle travel in passage from the top to the bottom surface of the layer is a direct measure of the thickness of the layer.

An object of the present invention is the provision of a gage, of the penetrating needle type, which shall be characterized by inherent accuracy while being simple in design and adapted for rapid determination of layer thickness.

Another object is to provide an improved gage of the type described which includes a self-contained, battery-powered signal lamp unit thus rendering the gage usable anywhere in the field as well as in the laboratory without need for an external source of power.

Yet another object is to provide a gage of the penetrating needle type wherein displacement of the needle is effected through a compound screw arrangement and which includes means for adjusting the measuring range of the gage and means, also, for adjusting the indicator so that the latter can be set to zero reading for each range.

A still further object is to provide a gage of the penetrating needle type in which the thickness indicator can be easily reset to zero reading whenever the gage is recalibrated.

The foregoing as well as other objects and advantages inherent in the invention will become more readily apparent from the detailed description to follow of a preferred structural embodiment thereof taken with the accompanying drawings in which:

Fig. 1 is a view of my improved gage in side elevation;

Fig. 2 is a view in end elevation with the connecting lead removed;

Fig. 3 is a view in vertical section taken on line 3—3 of Fig. 2;

Fig. 4 is a fragmentary detail; and

Figs. 5 and 6 are top and bottom plan views, respectively.

With reference now to the drawings, which are drawn to substantially full scale, the improved film gage is comprised of a body member 1 constituted by a block of electrically conductive material preferably aluminum having a pair of parallel spaced bores 2, 3 extending longitudinally therethrough. Bore 2 is threaded internally at 4 to engage the external threads 5 on a barrel 6 preferably of electrically conductive material, the thread pitch being preferably 40 threads to the inch. Barrel 6 is also threaded internally at 7 to engage the external threads 8 on the upper portion of a stem 9, also preferably of electrically conductive material, the pitch selected for the threads 7, 8 being different from that of threads 4, 5 but of the same hand so as to establish a rate of axial displacement for stem 9 equal to the difference in the two thread pitches. The pitch of threads 7, 8 is preferably 43.5 threads to the inch.

Below the threaded portion 8, stem 9 is provided with a collar portion 10 having a plurality of peripherally spaced threaded recesses 11 extending radially. In the illustrated embodiment, four such recesses spaced 90° apart are provided and are adapted to be brought selectively into registry with a slot 12 extending radially from the interior of bore 2 to the exterior of the body 1. Slot 12 is elongated in the direction of the axis of stem 9 and serves as an aperture through which a locking pin 13 is screwed into a selected one of the recesses 11 in collar 10. When threaded into recess 11, the cylindrical head 13a of the pin lies within the wall of slot 12. The diameter of head 13a is substantially equal to the width of slot 12 and hence serves to prevent rotation of stem 9 on its axis, thus bringing about a displacement of stem 9 along its axis as barrel 6 is rotated due to the differential, compound action of the two sets of threads 4—5 and 7—8. With a thread pitch of 40 threads/in., one revolution of sleeve 6 will advance the latter axially 1/40 of an inch in one direction and cause stem 9 to be advanced axially 2/87 of an inch in the opposite direction. Hence the net axial displacement of stem 9 for one revolution of sleeve 6 is equal to the difference between the two or 2.01149 mils.

Other thread combinations will also suggest themselves as practical for effecting the desired distance of axial travel of stem 9 for a specified rotation of sleeve 6. Thus, for example, if threads 7—8 are 43.5 to the inch and threads 4—5 are 23.25 to the inch, then stem 9 will be displaced 20.0653 mils for each complete revolution of sleeve 6.

The upper end of barrel 6 terminates in an upstanding bearing 14 of reduced diameter and a circular flanged portion 15 provided with an upstanding cylindrical lip 16 which thereby establishes an annular seat 17 for receiving dial 18. The periphery of lip 16 is milled for convenience in manipulation with the fingers. Dial 18 is provided with a central bore 19 of substantially the same diameter as bearing 14 so as to make a snug fit upon the latter as the dial is moved into its seat 17. A split expansion ring 20 of spring material seated in a groove 21 in the bearing 14 and pressing outwardly against the wall of the dial bore 19 is used to provide a spring friction loading as between dial 18 and its support upon barrel 6 to prevent accidental relative rotation therebetween from a selected setting.

A cap screw 22 screws into a threaded bore 23 that extends through the bearing portion 14 and communicates with the internally threaded portion 7 of the barrel. When screw 22 is run all the way down, the underside of the screw head 24 will lie adjacent the upper surface of the hub portion of dial 18 and hence prevent the latter from being raised out of position. A triangular post 25 upstanding upon the head of a cap screw 26 threaded into the gage body 1 and locked in the post by means of nut 27 with the apex facing radially inward adjacent the edge of dial 18 serves as a witness mark.

The periphery of dial 18 is graduated from 0 to 2 mils in 0.05 mil steps, and the nearest 0.01 mil can be estimated with a high degree of accuracy due to the wide spacing of the graduations which is made possible by the use of the comparatively large diameter dial. As previously explained, rotation of the barrel 6 and hence dial 18 will not result in an axial advance of the stem 9 of exactly 2 mils, but rather approximately 0.6% over such amount. However, this error is not serious in an instrument of this type since it is much less than other inherent variables of film or foil thickness.

The lower end of stem 9 is provided with a very small axial bore 30 for receiving a sharply pointed, electrically conductive, needle 31 secured within the bore by a set screw 32. The lower end of the bore 2 in the gage body 1 is closed by an electrically conductive screw cap 33, and a helical electrically conductive compression spring 34 disposed between the cap and the underface of collar 10 on stem 9 serves to eliminate any axial play which may be present in the movable parts. The inner face of end cap 33 is recessed at 35 to accommodate the lower end portion of stem 9 and the outer face of the cap is recessed at 36 to receive a foot 37 made from a material which is electrically non-conductive. Foot 37 is provided with an axial bore 37a just large enough to pass the needle 31 and its bottom surface is preferably curvilinear.

The other bore 3 in the gage body 1 is adapted to house a signal unit that will give an indication to the user at the instant when needle 31 reaches the bottom surface of the film or other material whose thickness is being measured. The signal unit includes an electrically conductive casing 38 set into the bore 3, a lamp socket 39, lamp 40, an end apertured screw cap 41 protecting lamp 40, battery 42, and contact spring 43. One end of battery 42. One end of spring 43 contacts the lower end of battery 42 and the other end of spring 43 is connected to a contact sleeve 44 of electrically conductive material set transversely of the longitudinal axis of the signal unit in a plug 45 of insulating material. A flange 46 at the lower end of casing 38 cooperates with an internal shoulder 47 in bore 3 to limit upward movement of the casing 38 in the gage body, when inserted in bore 3 from the bottom, and plug 45 is provided with an internal shoulder 48 seating against flange 46. Casing 38 and plug 45 are retained in place in bore 3 by screw plug 49. Gage body 1 also includes a transverse bore 50 lined with an insulating sleeve 51 in registry with contact sleeve 44 to permit passage of contact plug 52 at one end of the connecting lead 53. The other end of lead 53 terminates in a spring clip 54 adapted to be connected to terminal post 55 on a flat, electrically conductive, base plate 56 on which the material to be measured is placed.

When plug 49 is screwed down to the position shown in Fig. 3 of the drawing, contact spring 43 will be compressed, thus establishing a good electrical contact between the spring and lower end face 42a of battery 42 that serves as one battery terminal and between the other end terminal 42b of the battery and the end terminal 40a of lamp 40 which leads to one side of the lamp filament. The other side of the lamp filament is connected internally to the threaded lamp base 40b and hence is also connected electrically to the penetrating needle 31 by virtue of the several surface contacts made between the various components therebetween all of which are preferably electrically conductive. The path of connection can be traced easily in the vertical section of Fig. 3 from lamp base 40b to socket 39 to casing 38 to gage body 1 to barrel 6 to stem 9 to needle 31, or from body 1 through cap 33 and spring 34 to stem 9.

Gage body 1 is supported at three points on plate 56. One such point is constituted by the non-conductive foot 37 previously described. The two other support points are constituted by electrically non-conductive feet 57, 58 located at the corners of the gage body 1 so as to provide maximum stability. The bottom surfaces of feet 57, 58 are likewise curvilinear.

The radius of curvature of the bottom surfaces of feet 37, 57 and 58 on the gage now in production is approximately 3 inches. The curved surface although not essential is preferred nevertheless in order to minimize errors that might otherwise accrue in measuring film thickness on curved surfaces. In general, the magnitude of the radius of curvature will be determined by the manner and spacing of the feet as well as the diameter of the needle.

For added convenience in making adjustments, and installing or removing the various movable elements in the organization, hexagonal sockets 59 are provided in the upper end of stem 9, set screw 32 and locking pin 13 for receiving conventional hexagonal Allen wrenches. For similar reasons plug 49 is slotted at 60 to receive a screw driver, and end cap 33 is provided with a radially extending cylindrical socket 61 for receiving a conventional cylindrical type rod wrench.

*Operation*

Before making any measurements with the gage, the zero position should first be checked. Once the zero position is set, the gage should retain this setting for an extended period of time. However, in cases where a high degree of accuracy is desired, it is advisable to re-check the zero position after each ten or twenty measurements.

To set the zero position, the gage body 1 is placed upon the plate 56 or other similar flat, electrically conducting surface. Care should be taken that the surface of plate 56 as well as the three supporting feet 37, 57 and 58 are free from dirt and contamination. Connecting plug 52 is then inserted in sleeve 44 and the spring clip 54 is clamped to post 55 on plate 56. While exerting a firm downward pressure upon the gage body 1, barrel 6 and hence dial 18 should then be rotated clockwise until lamp 40 lights which event will take place as soon as the point of needle 31 touches plate 56. If the zero graduation on dial 18 does not coincide with the witness mark 25, dial 18 should be turned, while holding barrel 6 stationary, until the dial zero is centered on the witness mark. Once this zero position of the gage has been determined, the dial 18 will read zero when the point of needle 31 reaches the plane containing the three points of gage support established by feet 37, 57 and 58.

As previously mentioned, the drawings show the gauge at substantially full scale and hence with reference to Fig. 3 it is quite obvious that the needle 30 is very small in diameter and moreover the diameter of the circular opening at the mouth of bore 37a from which the needle emerges is also made as small as possible in order to place the line of contact of insulator member 37 with the film whose thickness is to be measured as close as possible to the needle axis containing the needle point. This is quite important in the attainment of accurate measurements for it is evident that the plane of reference or zero plane for this the fixed measuring element of the gauge is the one which contains the line of contact defined by the circular opening at the mouth of bore 37a.

To measure the thickness of either an attached film or a free film such as sheet plastic, paper, etc., the material is placed upon plate 56 and then the gage, set to zero, is placed upon the material. With the signal unit of the gage connected electrically as previously described for zero adjustment, and while exerting a firm downward pressure upon the gage body, barrel 6 is turned clockwise. As the clockwise rotation of barrel 6 continues, needle 31 will be lowered at a very low rate of travel due to the large amplification factor of the gage, which is about 3000 as related to the graduations on dial 18. The end of the needle penetrates further and further into the material finally coming out through the lower face of the material and simultaneously making contact with the surface of plate 56. Contact between the point of needle 31 and plate 56 is signalled to the operator by lighting of the lamp 40 since as previously explained, such contact completes the electrical circuit for energizing the lamp from battery 42. Thickness of the material is then read direct from dial 18 to the nearest hundredth of a mil. If the material being measured is over two mils thick, then two mils must be added to the direct reading on dial 18 for each complete revolution of the dial from the zero position.

With barrel 6 in a position such that dial 18 is located about midway of the length of witness post 25, the range of measurement will be from 0 to 20 mils. The upper limit of this normal range may be increased to 35 mils if desired by rotating barrel 6 counterclockwise until the top of dial 18 is approximately even with the top of witness post 25. Next, pin 13 is removed as is also the cap screw 22 to provide access to the upper end of stem 9. With the gage mounted on plate 56, and holding sleeve 6 stationary, stem 9 is rotated clockwise by means of an Allen wrench inserted into socket 59 until lamp 40 comes on. Pin 13 is then inserted in the nearest bore 11 in collar 10. Cap screw 22 is then replaced and the gage is then adjusted to the zero position using the same procedure previously described. The new range of the gage will then be from 0 to 35 mils.

The normal range of the gage can also be extended by setting the point of needle 31 to a zero position below the face of foot 37 with the aid of a shim of known thickness. With the gage adjusted to zero for the normal range of 0 to 20 mils previously described, cap screw 22 and locking pin 13 are first removed. The gage is then placed on plate 56 with the shim between foot 37 and the plate. With the wrench inserted in socket 59 in stem 9, the latter is run down, holding barrel 6 stationary, until needle 31 has penetrated the shim and made contact with plate 56 as indicated by the lighting of lamp 40. Pin 13 is then replaced in the nearest opening in collar 10 and the barrel 6 adjusted until contact with plate 56 is again just made by needle 31. Cap screw 22 is replaced and dial 18 is then set zero reading on the witness post 25. With this adjustment, the thickness of the shim is added to the value read from the gage to obtain the true thickness of any unknown material. Since the point of needle 31 will project below the face of foot 37 in this mode of adjustment for zero reading by a distance equal to the thickness of the shim, the gage body should be laid on its side when not in use to protect the needle point against damage. The principal advantage afforded by this arrangement is that it enables measurements to be taken more quickly since the needle penetrates the material to a depth equal to the thickness of the shim before rotation of barrel 6 is begun. For example, with a shim 20 mils thick, the first 20 mils thickness of the material is penetrated instantly. Without the shim however, ten turns of barrel 6 would be required to effect a like axial displacement of the needle point from its zero position.

Thickness measurements in excess of 35 mils can be accomplished by replacing needle 31 with a longer one. However since the axial travel of barrel 6 is limited and because of the high amplification factor between barrel 6 and stem 9, a long needle cannot be retracted until the needle point is flush with the face of foot 37. Consequently with this mode of adjustment, the gage could not be used for measuring films thinner than a certain minimum. For example, increasing the needle length by 40 mils will establish a measuring range from 40 to 60 mils.

Replacement of needle 31 is effected by removing end cap 33 and running down stem 9 until access to set screw 32 is obtained.

Replacement of battery 42 is accomplished by removing plug 49 which allows plug 45, spring 43 and battery 42 to drop out.

In the foregoing, it has been assumed that the film whose thickness is to be measured is in sheet form and capable of handling as such. The gage can also be used for measuring films that are attached such as paint films and other like coatings provided the base material on which the film is deposited is electrically conductive. In such case the film and base can be placed on the plate 56 with the film side up, or if it is not convenient to use the plate 56, electrical contact can be established directly from the clip end of lead 53 to the electrically conductive material forming the base on which the film is deposited.

In conclusion, I wish it to be understood that while the particular embodiment of my improved gage as described above is to be preferred, minor structural variations thereof may be made without however departing from the spirit and scope of the invention as defined in the appended claims. In addition to the choice of other thread combination for thread sets 4—5 and 7—8 as explained, the barrel 6 need not be necessarily electrically conductive in character if cap 33 and spring 34 are electrically conductive in which case the electrical connections in the signal lamp circuit will be from body 1 to cap 33 to spring 34 to stem 9 to needle 31. Also in such case it would be obvious that only the lower, non-threaded portion of stem 9 need be electrically conductive.

The gage may also be modified to operate from an external source of power by replacing battery 42 with an insulated conductor providing direct electrical circuit connections between bulb contact 40a and the plug and cord assembly 52, 53. Any desired external power source can then be inserted between plug 52 and clamp 54 to energize the indicator lamp 40.

For some applications where it may be desired to incorporate an electronic amplification circuit in the indicator organization, other types of indicators either directly fed from a battery or a line source can be connected between the body 1 of the gage and the metal base 56 on which the measurement is to be made.

I claim:

1. In a gage of the penetrating needle type for measuring the thickness of an electrically non-conductive film upon the surface of a base of electrically conductive material wherein contact between the needle and conductive base serves to close an electrical circuit for energizing a signal device, the combination comprising a gage body having a threaded bore extending longitudinally therein, a barrel having external threads engaging the threads in said bore and internal threads of the same hand as said external threads but of a different pitch engaged with external threads of a stem disposed within said barrel to establish a differential compound action between said barrel and stem effecting a relative axial displacement therebetween in opposite directions proportional to the difference in pitch between the external and internal threads on said barrel, a collar on said stem having a plurality of circumferentially spaced recesses extending radially inward from the periphery thereof, a removable locking pin extending through a transverse slot in the wall of said gage body into a selected one of said collar recesses, said slot being elongated in a direction longitudinally of said bore and said pin being sized to the width of said slot to restrain said stem against rotary movement and thereby effect displacement of the stem longitudinally of its axis upon rotation of said barrel, a needle depending from the lower end of said stem and adapted to be projected outwardly of said gage body, a tool socket in the upper end of said stem, said barrel having an axial bore providing access to said socket, a graduated dial carried by said barrel, means for adjusting said dial relative to said barrel, and a witness mark for said dial carried by said gage body.

2. In a gage of the penetrating needle type for measuring the thickness of an electrically non-conductive film upon the surface of a base of electrically conductive material wherein contact between the needle and conductive base serves to close an electrical circuit for energizing a signal device, the combination comprising a gage body having a threaded bore extending longitudinally therein, a barrel having external threads engaging the threads in said bore and internal threads of the the same hand as said external threads but of a different pitch engaged with external threads of a stem disposed within said barrel to establish a differential compound action between said barrel and stem effecting a relative axial displacement therebetween in opposite directions proportional to the difference in pitch between the external and internal threads on said barrel, a collar on said stem having a plurality of circumferentially spaced recesses extending radially inward from the periphery thereof, a removable locking pin extending through a transverse slot in the wall of said gage body into a selected one of said collar recesses, said slot being elongated in a direction longitudinally of said bore and said pin being sized to the width of said slot to restrain said stem against rotary movement and thereby effect displacement of the stem longitudinally of its axis upon rotation of said barrel, a needle depending from the lower end of said stem and adapted to be projected outwardly of said gage body, said barrel having a longitudinal bore providing access to the upper end of said stem for effecting rotary adjustment of said stem upon removal of said locking pin, a graduated dial carried by said barrel, means for adjusting said dial relative to said barrel, and a witness mark for said dial carried by said gage body.

3. In a gage of the penetrating needle type for measuring the thickness of an electrically non-conductive film upon the surface of a base of electrically conductive material wherein contact between the needle and conductive base serves to close an electrical circuit for energizing a signal device, the combination comprising a gage body having a threaded bore extending longitudinally therein, a barrel having external threads engaging the threads in said bore and internal threads of the same hand as said external threads but of a different pitch engaged with external threads of a stem disposed within said barrel to establish a differential compound action between said barrel and stem effecting a relative axial displacement therebetween in opposite directions proportional to the difference in pitch between the external and internal threads on said barrel, a releasable locking pin extending through a transverse slot in the wall of said gage body into a transverse recess provided in said stem, said slot being elongated in a direction longitudinally of said bore and said pin being sized to the width of said slot to restrain said stem against rotary motion and thereby effect displacement of the stem longitudinally of its axis upon rotation of said barrel, a needle depending from the lower end of said stem and adapted to be projected outwardly of said gage body, said barrel having a bore providing access to the upper end of said stem for effecting rotary adjustment of said stem upon release of said locking pin, a graduated dial carried by said barrel, means for adjusting said dial relative to said barrel and a witness mark for said dial carried by said gage body.

4. A gage for measuring the thickness of an electrically non-conducting film comprising, a gage body of electrically conductive material having a threaded bore extending longitudinally therethrough, an electrically conductive barrel having external threads engaging the threads in said bore and internal threads of the same hand as said external threads but of a different pitch engaged with external threads of an electrically conductive stem disposed within said barrel to establish a differential compound action between said barrel and stem effecting a relative axial displacement therebetween in opposite directions proportional to the difference in pitch between the external and internal threads on said barrel, a collar on said stem having a plurality of circumferentially spaced recesses extending radially inward from the periphery thereof, a releasable locking pin extending through a transverse slot in the wall of said gage body into a selected one of said collar recesses, said slot being elongated in a direction longitudinally of said bore and said pin being sized to the width of said slot to restrain said stem against rotary motion and thereby effect displacement of the stem longitudinally of its axis upon rotation of said barrel, an electrically conductive needle depending from the lower end of said stem, a cap member closing the lower end of said bore, said cap member including a non-conductive foot having a bore through which said needle is adapted to pass, a coil spring held in compression between the inner face of said cap member and the lower face of said stem collar, a circular flange at the upper end of said barrel having an upturned cylindrical lip establishing a dial seat, a graduated dial disposed in said seat, means for securing said dial in a selected position of adjustment on its seat, a post upstanding upon said gage body adjacent the periphery of said flange establishing a witness mark for the dial graduations; said gage body having a second bore extending longitudinally therein, a signal unit including a casing disposed in said second bore for receiving a battery and an electric signal device energizeable by said battery, releasable means retaining said casing in said second bore, circuit means extending from one terminal of said battery through said signal device to said conductive needle through the conductive material of said gage body, barrel and stem, and means including an external conductive lead for establishing a circuit from the other terminal of said battery to an electrically conductive surface on which said film is adapted to be placed for measurement thereby conditioning said signal device for energization from said battery when the point of said needle comes into contact with said base plate after penetrating said film.

MAYNARD R. EUVERARD.

References Cited in the file of this patent

UNITED STATES PATENTS

| Number | Name | Date |
|---|---|---|
| 335,110 | Clifford et al. | Feb. 2, 1886 |
| 346,705 | Barnes | Aug. 3, 1886 |
| 373,705 | Wells | Nov. 22, 1887 |
| 1,311,548 | Blush | July 29, 1919 |
| 1,327,114 | Rhein | Jan. 6, 1920 |
| 1,961,764 | Horstkotte | June 5, 1934 |
| 2,290,940 | Carson | July 28, 1942 |
| 2,544,192 | Tornansky | Mar. 6, 1951 |
| 2,545,782 | Hugin | Mar. 20, 1951 |
| 2,603,876 | Wedin | July 22, 1952 |

FOREIGN PATENTS

| Number | Country | Date |
|---|---|---|
| 182,583 | Germany | Mar. 19, 1907 |